(12) United States Patent
Randolph, III et al.

(10) Patent No.: US 7,674,449 B2
(45) Date of Patent: Mar. 9, 2010

(54) PROCESS AND APPARATUS FOR THE COMBUSTION OF A SULFUR-CONTAINING LIQUID

(75) Inventors: David L. Randolph, III, Wright City, MO (US); Samuel Chan, Ballwin, MO (US)

(73) Assignee: MECS, Inc., St. Louis, MO (US)

( * ) Notice: Subject to any disclaimer, the term of this patent is extended or adjusted under 35 U.S.C. 154(b) by 194 days.

(21) Appl. No.: 11/916,145

(22) PCT Filed: Jun. 2, 2006

(86) PCT No.: PCT/US2006/021455

§ 371 (c)(1),
(2), (4) Date: Nov. 30, 2007

(87) PCT Pub. No.: WO2006/130833

PCT Pub. Date: Dec. 7, 2006

(65) Prior Publication Data

US 2009/0226362 A1    Sep. 10, 2009

Related U.S. Application Data

(60) Provisional application No. 60/686,776, filed on Jun. 2, 2005.

(51) Int. Cl.
*C01B 17/54* (2006.01)
*C01B 17/69* (2006.01)
*F23C 99/00* (2006.01)
*F23L 7/00* (2006.01)

(52) U.S. Cl. .................. 423/522; 423/539; 423/542; 423/543; 431/2; 431/253; 431/356

(58) Field of Classification Search ................. 423/522, 423/539, 542, 543; 431/2, 253, 356
See application file for complete search history.

(56) References Cited

U.S. PATENT DOCUMENTS

| 1,917,693 A | 7/1933 | Bencowitz |
| 2,031,403 A | 2/1936 | Bencowitz |

(Continued)

FOREIGN PATENT DOCUMENTS

CA    762374    7/1967

(Continued)

OTHER PUBLICATIONS

Bańczyk et al., "Utilization of the Studies on Gas Turbulence for the Construction of New Furnaces for the Combustion of Atomized Liquid Sulfur," Inz. Apar. Chem., 1974, pp. 1-10, vol. 13, No. 5, 11-14.

(Continued)

*Primary Examiner*—Timothy C Vanoy
(74) *Attorney, Agent, or Firm*—Senniger Powers LLP

(57) ABSTRACT

Apparatus and processes for the production of a sulfur dioxide-containing combustion gas are provided in which a sulfur-containing liquid is pneumatically atomized with a sulfur gun or lance that utilizes an atomizing gas to form an atomized combustion mixture for combustion in a sulfur furnace. The sulfur dioxide-containing combustion gas may be used in the manufacture of sulfuric acid by the contact process.

64 Claims, 6 Drawing Sheets

U.S. PATENT DOCUMENTS

| | | |
|---|---|---|
| 3,172,735 A | 3/1965 | Barclay et al. |
| 3,879,530 A | 4/1975 | Perret et al. |
| 3,936,275 A | 2/1976 | Perret et al. |
| 4,024,210 A | 5/1977 | Chalmers |
| 4,043,717 A | 8/1977 | Riano |
| 4,064,223 A | 12/1977 | Maier et al. |
| 4,081,500 A | 3/1978 | Malcolm |
| 4,149,836 A | 4/1979 | Price |
| 4,154,399 A | 5/1979 | Riano |
| 4,386,738 A | 6/1983 | Bauver, II |
| 4,389,356 A | 6/1983 | Higgins |
| 4,412,653 A | 11/1983 | Bresowar et al. |
| 4,573,638 A | 3/1986 | Junkers |
| 4,644,879 A | 2/1987 | Grethe et al. |
| 4,728,036 A | 3/1988 | Bennett et al. |
| 5,055,279 A | 10/1991 | Hirt et al. |
| 5,130,112 A | 7/1992 | McAlister et al. |
| 5,176,325 A | 1/1993 | Vidusek |
| 5,240,183 A | 8/1993 | Bedaw et al. |
| 5,372,312 A | 12/1994 | Vidusek |
| 5,467,925 A | 11/1995 | Riano |
| 5,498,790 A | 3/1996 | Grendel et al. |
| 5,707,010 A | 1/1998 | Manfre et al. |
| 5,732,885 A | 3/1998 | Huffman |
| 5,807,530 A | 9/1998 | Anderson |
| 6,511,312 B2 | 1/2003 | Primdahl |
| 2003/0077217 A1 | 4/2003 | Eichenhofer et al. |
| 2004/0086451 A1* | 5/2004 | Labrana Valdivia et al. . 423/543 |
| 2009/0068088 A1* | 3/2009 | Daum et al. ............... 423/543 |

FOREIGN PATENT DOCUMENTS

| | | |
|---|---|---|
| EP | 0705644 A1 | 10/1996 |
| EP | 0875719 B1 | 10/2001 |
| FR | 1386143 | 1/1965 |
| FR | 2395974 | 1/1979 |
| GB | 858939 | 1/1961 |
| GB | 1341861 | 12/1973 |

OTHER PUBLICATIONS

Bańczyk et al., "Studies on Atomizing Liquid Sulfur Using Atomizers of Different Construction," International Chemical Engineering, 1976, pp. 74-78, vol. 16, No. 1.

Chwalibog, et al., "Modernization of the Installation for the Combustion of Liquid Sulfur in Sulfuric Acid Plants," Inz. Apar. Chem., 1974, pp. 1-18, vol. 13, No. 5.

Conroy et al., "Combustion of Sulfur in a Venturi Spray Burner," Industrial and Engineering Chemistry, 1949, pp. 2741-2748, vol. 41, No. 12.

Kowalski, "A Study of Liquid Sulfur Oxidation Kinetics II. Liquid Sulfur Oxidation Kinetics," Chemia Stosowana, 1960, pp. 407-428, vol. 4.

Bete Fog Nozzle, Inc., SA High-Flow Air Atomizing, 2004, 2 Pages.

Goodrich, Airo Air Atomized Nozzles Product Brochure, 5 Pages.

Turbosonic Inc., "Turbotak Atomizing Nozzles," 2004, 3 Pages.

International Search Report Mailed Sep. 25, 2006 in Connection with PCT/US2006/021455, 4 Pages.

International Preliminary Report on Patentability (dated Oct. 20, 2008) issued in connection with International Application No. PCT/US2006/021455.

* cited by examiner

PROCESS AND APPARATUS FOR THE COMBUSTION OF A SULFUR-CONTAINING LIQUID

This application is a United States National Stage Application based on International Application No. PCT/US2006/021455, filed Jun. 2, 2006, and claims the benefit of U.S. Provisional Application Ser. No. 60/686,776, filed Jun. 2, 2005, the entire contents of which are incorporated herein by reference.

FIELD OF THE INVENTION

The present invention relates generally to techniques and apparatus for making an atomized sulfur combustion mixture comprising particles or droplets of a sulfur-containing liquid by atomizing a sulfur-containing liquid utilizing an atomizing gas. The present invention is particularly suited for the production of an atomized sulfur combustion mixture for combustion in a sulfur furnace to produce a sulfur dioxide-containing combustion gas useful in the manufacture of sulfuric acid by the contact process.

BACKGROUND OF THE INVENTION

The conventional contact process for the manufacture of sulfuric acid includes burning or combusting molten sulfur in air or other oxygen-containing gas in the combustion chamber of a sulfur furnace to produce a combustion gas comprising sulfur dioxide, oxidizing the sulfur dioxide produced in one or more catalytic oxidation stages of a converter to produce a conversion gas comprising sulfur trioxide, and absorbing the sulfur trioxide in aqueous sulfuric acid to form additional sulfuric acid product.

In order to prepare the sulfur for combustion, it is typically liquefied and fed under pressure through one or more sulfur guns or lances directed into the combustion chamber of a sulfur furnace supplied with combustion air or other oxygen-containing gas. The sulfur lance produces atomized sulfur particles that are discharged into the combustion chamber as a spray of sulfur droplets. Most conventional sulfur lances operate hydraulically to produce an atomized spray of sulfur particles. That is, atomization is achieved by passing the liquefied sulfur under pressure through the nozzle of the lance into the combustion chamber of the furnace without the aid of an atomizing gas. Typically, hydraulic atomization produces a spray of atomized sulfur droplets having an average particle size or diameter in excess of 300 μm or more and containing particles as large as 2000 μm or more. With these large particle sizes, it is difficult to ensure sufficiently rapid vaporization and combustion of the liquid sulfur particles within the combustion chamber volume. Moreover, hydraulically-operated sulfur lances sometimes suffer from the emission of insufficiently atomized liquid sulfur (i.e., "drool") from the nozzle of the lance. As a result of these deficiencies, unburned sulfur sometimes deposits outside the intended combustion zone within the sulfur furnace, particularly in smaller sulfur furnace installations or during times of turndown when the sulfur pressure is reduced, leading to process inefficiency and increased maintenance requirements.

As an alternative to hydraulic atomization, it has been proposed to pneumatically atomize liquid sulfur utilizing an atomizing gas such as air (See, for example, U.S. Pat. No. 5,807,530 (Anderson); and Conroy et al., *Combustion of Sulfur in a Venturi Spray Burner*, Industrial & Engineering Chemistry, Vol. 41, No. 12, pp. 2741-2748 (1949)). Anderson, for example, discloses the pneumatic atomization of molten sulfur to an average particle size on the order of about 10 μm utilizing an atomizing sulfur gun fed with sulfur and atomizing air. In order to ensure an adequate retention time of the spray of atomized sulfur particles in the combustion zone, the apparatus of Anderson further includes a concentric combustor and windbox arrangement that imparts a vertical flow of combustion air from the windbox that converges at the nozzle of the atomizing sulfur gun. The sulfur gun of Anderson includes the atomizing nozzle assembly described in U.S. Pat. No. 4,728,036 (Bennett et al.) in which sulfur and air flows are mixed in and passed through a single narrow annular divergent frustoconical passage to produce a spray of atomized liquid sulfur particles discharged into the combustion chamber of the furnace.

Although the teachings of Anderson are significant, the disclosed apparatus is somewhat complex and difficult to integrate in an existing plant. Furthermore, pneumatic atomization of sulfur-containing liquids to an average particle size of 10 μm represents a significant operational cost. That is, despite the purported improvement in rapid vaporization, combustion and lower deposition of unburned sulfur, overall process economics are still hampered to some extent by the attendant power requirements. Moreover, the nozzle design employed in the sulfur gun of Anderson is susceptible to blockage of the narrow annular passage through which the spray of atomized sulfur is emitted by solid contaminants often found in molten sulfur contained in sulfur pits used in commercial sulfuric acid manufacturing operations.

Accordingly, a need persists for effective techniques and apparatus for producing atomized sulfur combustion mixtures that ensure sufficiently rapid vaporization and complete combustion within the design combustion chamber volume to minimize deposition of unburned sulfur in the sulfur furnace, while also improving the overall economics of both the initial capital cost of equipment and the on-going operational costs.

SUMMARY OF THE INVENTION

Among the objects of the present invention, therefore, are the provision of an improved process and apparatus for the combustion of a sulfur-containing liquid to produce a combustion gas comprising sulfur dioxide wherein the sulfur-containing liquid is pneumatically atomized with an atomizing gas in a sulfur lance to form an atomized sulfur combustion mixture for discharge into the combustion chamber of a sulfur furnace; the provision of such an improved process and apparatus capable of forming a sulfur combustion mixture having desirable particle or droplet size characteristics that ensure sufficiently rapid vaporization and complete combustion within the design combustion chamber volume to minimize deposition of unburned sulfur in the sulfur furnace, while also improving the overall economics of both the initial capital cost of equipment and the on-going operational costs; the provision of such an improved process and apparatus capable of minimizing the generation of nitrogen oxides in the sulfur dioxide-containing combustion gas; and the provision of such an improved process and apparatus which is relatively simple and easy to integrate into an existing installation.

Briefly, therefore, the present invention is directed to an apparatus for the combustion of a sulfur-containing liquid to produce a combustion gas comprising sulfur dioxide. The apparatus comprises a furnace comprising a combustion chamber, a pressurized source of the sulfur-containing liquid, a pressurized source of an atomizing gas, and at least one sulfur lance positioned for discharging an atomized sulfur combustion mixture comprising particles of the sulfur-containing liquid and atomizing gas into the combustion chamber wherein the sulfur-containing liquid particles are combusted in the presence of oxygen to produce the combustion gas comprising sulfur dioxide. The sulfur lance comprises a mixing and atomizing nozzle directed into the combustion chamber, a first conduit communicating with the pressurized source of sulfur-containing liquid and the nozzle and a second conduit communicating with the pressurized source of atomizing gas and the nozzle. The nozzle is adapted for mixing the sulfur-containing liquid and the atomizing gas to form the atomized sulfur combustion mixture and has a plurality of spray apertures therein through which the atomized sulfur combustion mixture is discharged under pressure into the combustion chamber.

The present invention is also directed to a process for the combustion of a sulfur-containing liquid to produce a combustion gas comprising sulfur dioxide. The process comprises introducing a flow of pressurized sulfur-containing liquid and a flow of pressurized atomizing gas into at least one sulfur lance comprising first and second conduits communicating with a mixing and atomizing nozzle having a plurality of spray apertures therein. The pressurized sulfur-containing liquid is passed through the first conduit and the pressurized atomizing gas is passed through the second conduit into the mixing and atomizing nozzle. The pressurized sulfur-containing liquid and the pressurized atomizing gas are passed through the mixing and atomizing nozzle to affect atomization of the sulfur-containing liquid and form an atomized sulfur combustion mixture comprising particles of sulfur-containing liquid and atomizing gas discharged under pressure through the plurality of spray apertures into a combustion chamber of a furnace. The sulfur-containing liquid particles are combusted in the presence of oxygen in the combustion chamber to produce the combustion gas comprising sulfur dioxide.

In accordance with another embodiment of the present invention, the process includes introducing a flow of pressurized sulfur-containing liquid and a flow of pressurized atomizing gas into a sulfur lance comprising first and second conduits communicating with a mixing and atomizing nozzle having at least one spray aperture therein. The pressurized sulfur-containing liquid is passed through the first conduit and the pressurized atomizing gas is passed through the second conduit into the mixing and atomizing nozzle. The pressurized sulfur-containing liquid and the pressurized atomizing gas are passed through the mixing and atomizing nozzle to affect atomization of the sulfur-containing liquid and form an atomized sulfur combustion mixture comprising particles of sulfur-containing liquid and atomizing gas discharged under pressure through the at least one spray aperture into a combustion chamber of a furnace. The particle size distribution exhibited by the atomized sulfur combustion mixture discharged into the combustion chamber is characterized by at least about 90% by volume of the particles of sulfur-containing liquid contained therein having a diameter of less than about 500 μm. Preferably, at least about 80% by volume of the particles of sulfur-containing liquid contained in the atomized sulfur combustion mixture discharged into the combustion chamber have a diameter of from about 50 μm to about 500 μm and the median particle diameter (volume or mass basis) of the atomized sulfur combustion mixture is from about 50 μm to about 150 μm. The sulfur-containing liquid particles are combusted in the presence of oxygen in the combustion chamber to produce the combustion gas comprising sulfur dioxide.

In a further embodiment, an apparatus for the combustion of a sulfur-containing liquid to produce a combustion gas comprising sulfur dioxide is retrofitted in accordance with the present invention. More specifically, the apparatus to be retrofitted comprises a furnace comprising a combustion chamber, a pressurized source of the sulfur-containing liquid, and at least one sulfur lance adapted to hydraulically atomize the sulfur-containing liquid from the pressurized source and positioned for discharging the atomized sulfur combustion mixture under pressure into the combustion chamber wherein the sulfur-containing liquid particles are combusted in the presence of oxygen to produce the combustion gas comprising sulfur dioxide. The retrofit method comprises providing a pressurized source of an atomizing gas and positioning at least one additional or replacement sulfur lance to discharge a pneumatically atomized sulfur combustion mixture comprising particles of the sulfur-containing liquid and an atomizing gas into the combustion chamber. The additional or replacement sulfur lance comprises a mixing and atomizing nozzle directed into the combustion chamber, a first conduit communicating with the pressurized source of sulfur-containing liquid and the nozzle and a second conduit communicating with the pressurized source of atomizing gas and the nozzle. The mixing and atomizing nozzle is adapted for mixing the sulfur-containing liquid and the atomizing gas to form the pneumatically atomized sulfur combustion mixture and having a plurality of spray apertures therein through which the pneumatically atomized sulfur combustion mixture is discharged under pressure into the combustion chamber.

The sulfur dioxide-containing combustion gas produced in accordance with the present invention may be used in the production of sulfuric acid by the contact process or put to other suitable use.

Other objects and features of this invention will be in part apparent and in part pointed out hereinafter.

DETAILED DESCRIPTION OF THE INVENTION

In accordance with the present invention, improved apparatus and processes for pneumatically atomizing a sulfur-containing liquid to prepare a sulfur combustion mixture comprising particles or droplets of the atomized sulfur-containing liquid and an atomizing gas have been devised. The present invention is particularly suited for the production of an atomized sulfur combustion mixture for combustion in a sulfur furnace to produce a sulfur dioxide-containing combustion gas useful in the manufacture of sulfuric acid by the contact process. In one embodiment of the present invention, a pneumatically-operated sulfur lance used to discharge the sulfur combustion mixture into a sulfur combustion furnace includes a mixing and atomizing nozzle adapted for mixing the sulfur-containing liquid and the atomizing gas to form the sulfur combustion mixture and having a plurality of spray apertures therein through which the combustion mixture is discharged under pressure into the furnace. The use of a mixing and atomizing spray nozzle including a plurality of spray apertures produces a relatively dense, compact spray geometry in the form of a plurality of generally symmetrical, cone-shaped sprays that provides the combustion apparatus with substantial capacity or throughput for a given combustion chamber design volume. Moreover, the pneumatically-operated lance in accordance with the present invention produces a sulfur combustion mixture having a particle size distribution that can be readily controlled to ensure sufficiently rapid vaporization and combustion of the liquid sulfur particles within the design volume of the combustion chamber while minimizing generation of nitrogen oxides and overall power requirements.

Figure 1:
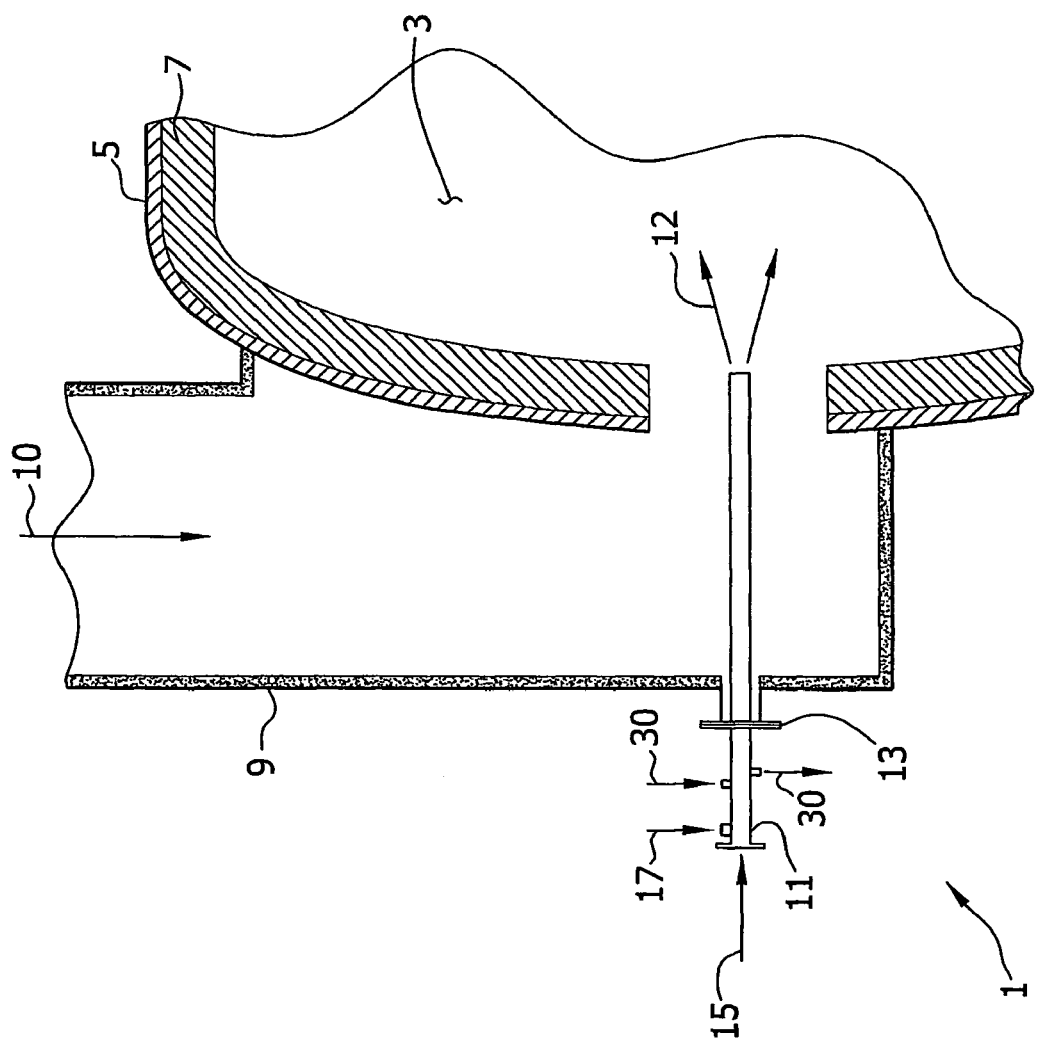
FIG. 1 is a schematic, fragmentary vertical section of an apparatus for combustion of a sulfur-containing liquid.

FIG. 1 illustrates an apparatus of this invention for the combustion of a sulfur-containing liquid to produce a combustion gas comprising sulfur dioxide. The apparatus includes a sulfur furnace, generally designated 1, comprising a sulfur combustion chamber 3. The combustion chamber is typically generally cylindrical and defined by furnace wall 5 of suitable construction and comprising heat-resistant lining 7 made of ceramic brick or other refractory material. As shown in FIG. 1, at one end of the combustion furnace (generally opposite the end from which the hot sulfur dioxide-containing combustion gases exit the combustion chamber for further processing) is located combustion air inlet or windbox 9 for introducing a flow 10 of dried or undried ambient air or other oxygen-containing gas into the combustion chamber to support combustion of the sulfur-containing liquid therein. At least one pneumatically-operated sulfur gun or lance 11 is positioned for spraying or discharging an atomized sulfur combustion mixture 12 comprising particles or droplets of a sulfur-containing liquid and an atomizing gas into the combustion chamber. The lance extends through a wall of windbox 9 and is secured thereto by means of mounting flange 13 such that the discharge end of the lance is disposed in an opening in furnace wall 5 through which the supply of combustion air from the windbox also enters combustion chamber 3. Although the apparatus illustrated in FIG. 1 includes a single sulfur lance, it is recognized that an array of two or more similarly positioned lances may be suitably employed depending upon the design capacity of the system. Typically, the combustion apparatus will include a plurality of sulfur lances. Although not shown in FIG. 1, the combustion apparatus includes a gas-fired burner and igniter or similar means used to preheat the combustion chamber prior to start-up.

The combustion chamber may contain baffle means therein to aid in mixing the flow of combustion air and the atomized sulfur combustion mixture, for example, when space limitations limit the size of the combustion chamber available for adequate mixing. The baffles may also aid in combustion by providing an expanded heated surface area for contacting droplets of the sulfur-containing liquid discharged into the combustion chamber. However, it is preferred that the furnace be sized large enough relative to the process design capacity such that the combustion chamber is free of baffles. For example, the ratio of the volume of the combustion chamber to the flow rate of the atomized sulfur combustion mixture discharged into the combustion chamber is generally at least about 0.5 seconds, preferably from about 0.5 seconds to about 1.1 seconds and even more preferably from about 0.5 seconds to about 0.65 seconds.

The pneumatically-operated sulfur lance is supplied with a pressurized source of a sulfur-containing liquid 15 and a pressurized source of an atomizing gas 17. The following discussion focuses on pneumatic atomization of molten sulfur utilizing an oxygen-containing gas (e.g., air) as the atomizing gas. However, as described in greater detail below, it will be apparent that that this discussion generally applies to the atomization of other sulfur-containing liquids using other atomizing gases to prepare an atomized sulfur combustion mixture comprising particles of the sulfur-containing liquid suitable for combustion in the production of a sulfur dioxide-containing combustion gas.

Molten sulfur to supply the combustion furnace may be retained in a heated sulfur pit. The viscosity of molten sulfur increases rapidly at temperatures approaching about 160° C. and, therefore, the temperature of the molten sulfur prior to atomization is preferably maintained well below 160° C. In order to maintain the molten sulfur at a viscosity suitable for effective atomization and to provide an atomized sulfur combustion mixture of desirable particle size distribution as described in greater detail below, the molten sulfur is typically maintained at a temperature of from about 120° to about 140° C. prior to atomization. The molten sulfur is pumped under pressure through a suitable conduit and connector to supply the lance. Similarly, a compressor is used to supply the lance with a pressurized flow of air as the atomizing gas through a suitable conduit and connector. The sulfur pit, sulfur pump, air compressor, transfer conduits, connectors, filters and other components of the sulfur and air delivery systems used to supply the lance are known to those skilled in the art and have been omitted from the apparatus depicted in FIG. 1.

As noted above, sulfur furnace 1 is supplied with a flow 10 of dried or undried oxygen-containing gas through windbox 9 to support the combustion of the sulfur-containing liquid in combustion chamber 3. For reasons of practicality and economics, ambient air, typically dried, is usually used as the oxygen source introduced into the combustion chamber and undried ambient air is used as the atomizing gas supplied to sulfur lance 11. Regardless of the composition of the oxygen-containing gas delivered through the windbox, because there are greater operational and capital costs associated with larger process equipment, it is usually preferred to minimize the volume while increasing the sulfur dioxide gas strength of the resulting combustion gas. Accordingly, these considerations favor using molten sulfur as the sulfur-containing liquid. Typically, in those embodiments where the sulfur dioxide-containing combustion gas is used in the production of sulfuric acid, the rate of flow of dried combustion air or other oxygen-containing gas through windbox 9 is adjusted relative to the sulfur flow rate through lance 11 (or plurality of such lances) so as to provide an excess of combustion oxygen in a quantity sufficient such that the oxygen content of the resulting combustion gas is sufficient for later conversion of the sulfur dioxide to sulfur trioxide. Of course, if undried air or other oxygen-containing gas is used as the atomizing gas in the sulfur lance, appropriate allowance should be made for the oxygen introduced into the combustion chamber as part of the atomizing gas and the flow of oxygen introduced through the windbox adjusted accordingly. When air is used to supply the combustion chamber of the sulfur furnace both through the windbox and as the atomizing gas fed through the sulfur lance, the atomizing air will typically account for from about 0.05% to about 0.4% of the total air flow to the combustion chamber.

By way of example, in a combustion apparatus used in conjunction with a contact sulfuric acid plant having a capacity of about 2,500 tons of sulfuric acid per day, the liquid sulfur flow through one or more lances at about 85 psig (590 kPa) and about 135° C. might typically be about 77 gpm (290 lpm) and the air flow through the windbox would be about 112,000 SCFM ($3.2 \times 10^6$ SLPM) at a pressure of about 21.2 psia (146 kPa) along with about 140 SCFM (3,960 SLPM) of atomizing air at a pressure of comparable magnitude to that of the liquid sulfur feed fed through the sulfur lance. When molten sulfur is burned in an excess of dried air, the resulting combustion gas may have a sulfur dioxide gas strength of from about 8 to about 14 mole %, more typically, from about 9 to about 12 moles and an oxygen concentration of from about 7 to about 13 mole %, more typically from about 9 to about 12 mole %. However, it should be understood that in the practice of the present invention it is not necessary to supply the sulfur furnace with a stoichiometric excess of combustion oxygen and that additional or supplemental air or other oxygen-containing gas may be mixed with the sulfur dioxide-containing combustion gas exiting the sulfur furnace in an amount sufficient to allow later conversion of the sulfur dioxide to sulfur trioxide. Operation of the sulfur furnace with a stoichiometric or near stoichiometric quantity of oxygen required for the combustion of the sulfur values in the sulfur-containing liquid to sulfur dioxide may be advantageous in reducing the production of nitrogen oxides in the sulfur furnace.

Figure 2:
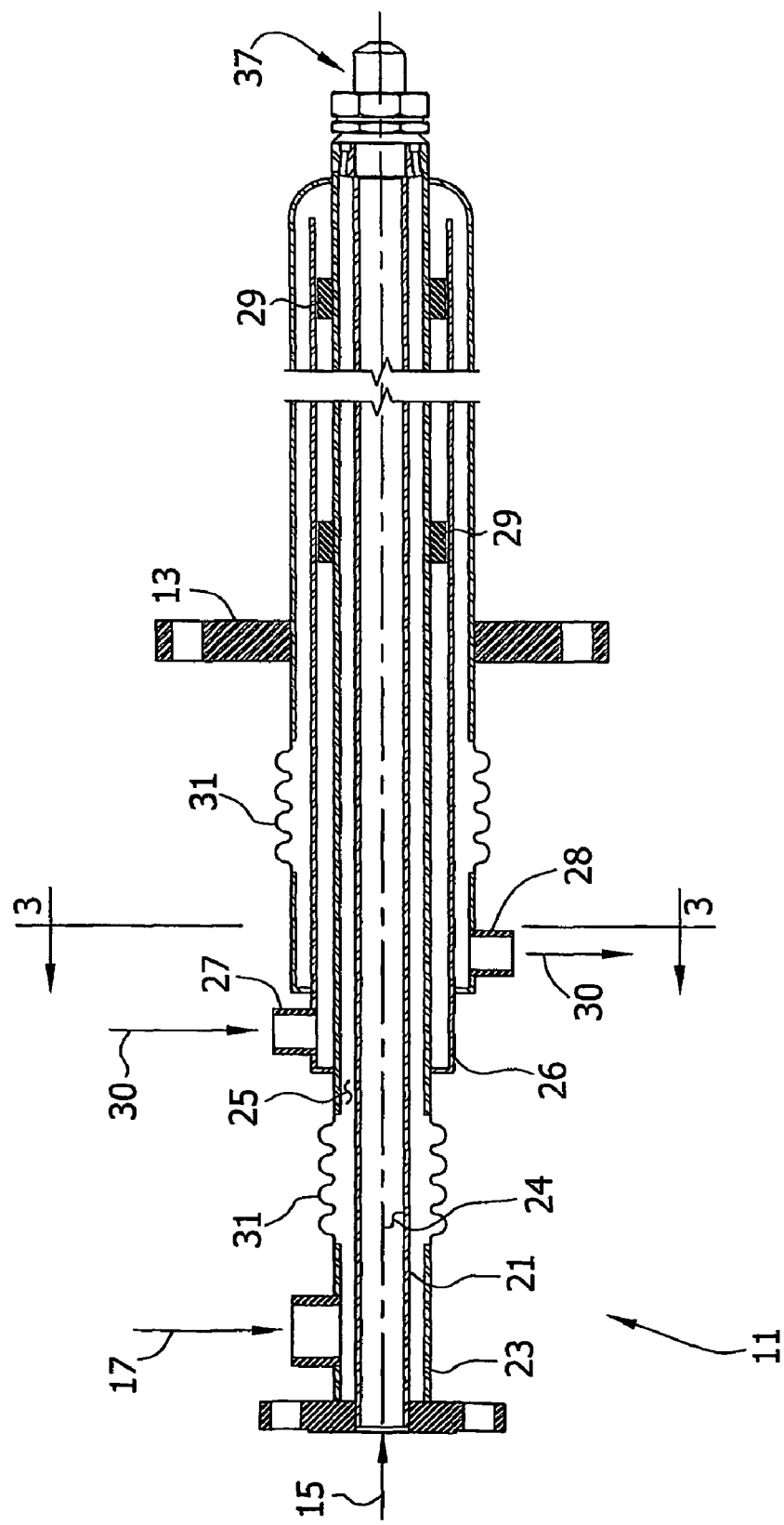
FIG. 2 is a fragmentary, longitudinal section of a sulfur lance.
Figure 3:
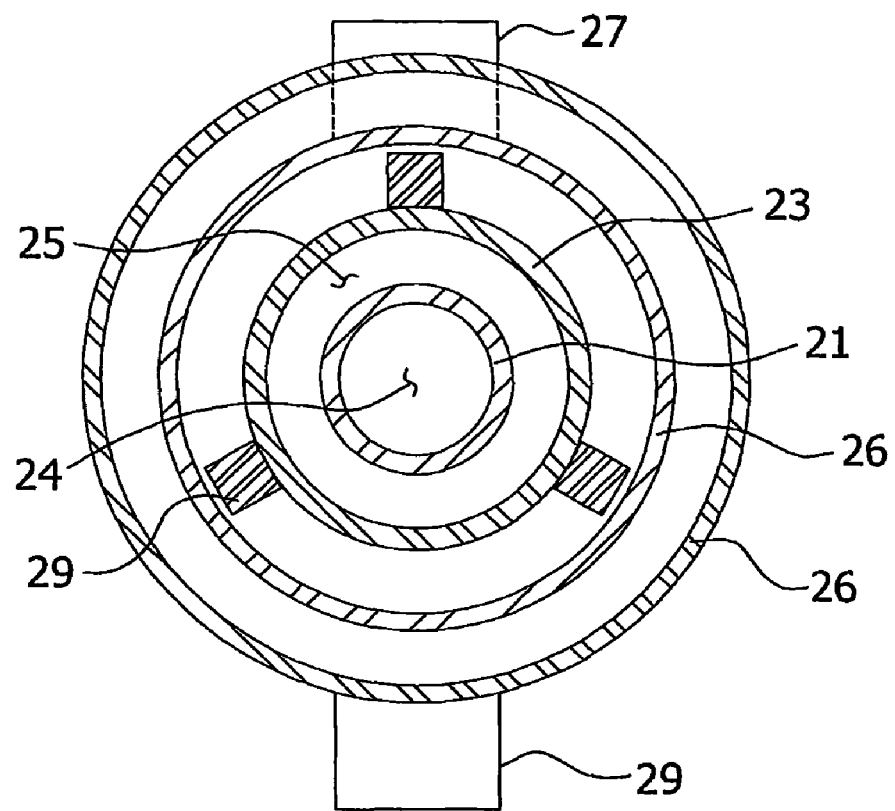
FIG. 3 is a section taken along line 3-3 of FIG. 2.

Referring now to FIGS. 2 and 3, sulfur lance 11 comprises a first or sulfur conduit 21 having an inlet end into which the flow of pressurized sulfur-containing liquid is pumped from the pressurized source 15, and a second or atomizing gas conduit 23 having an inlet end into which the flow of pressurized atomizing gas is introduced from the pressurized source 17. In the embodiment shown in FIG. 2, first conduit 21 is disposed within and concentric with second conduit 23 such that the first (inner) conduit defines an inner axial passage 24 for the flow of the sulfur-containing liquid and the first conduit and second (outer) conduit together define an outer axial passage 25 for flow of the atomizing gas. The inner and outer axial flow passages 24 and 25 preferably have cross-sectional flow areas proportional to the maximum expected sulfur and atomizing gas flow rates to permit adequate flow at the design operating pressures. In order to preheat the atomizing gas, control the temperature of the lance in general and maintain the desired sulfur and atomizing gas temperatures along the inner and outer axial passages within the lance in particular, outer conduit 23 can be surrounded by a conventional jacket 26 having an inlet 27 and an outlet 28 so that steam 30 or other heat transfer fluid may be circulated through the jacket. The jacket may be of dual-walled construction and provided with support tabs 29. Outer conduit 23 and steam jacket 26 may be constructed with flexible sections or expansion joints 31 to permit expansion and contraction due to temperature variations during operation of the combustion apparatus. Moreover, the pneumatically-operated lance fed with a flow of atomizing gas assists in maintaining the temperature of the lance within acceptable limits, particularly when the flow of sulfur-containing liquid is interrupted.

Figure 4:
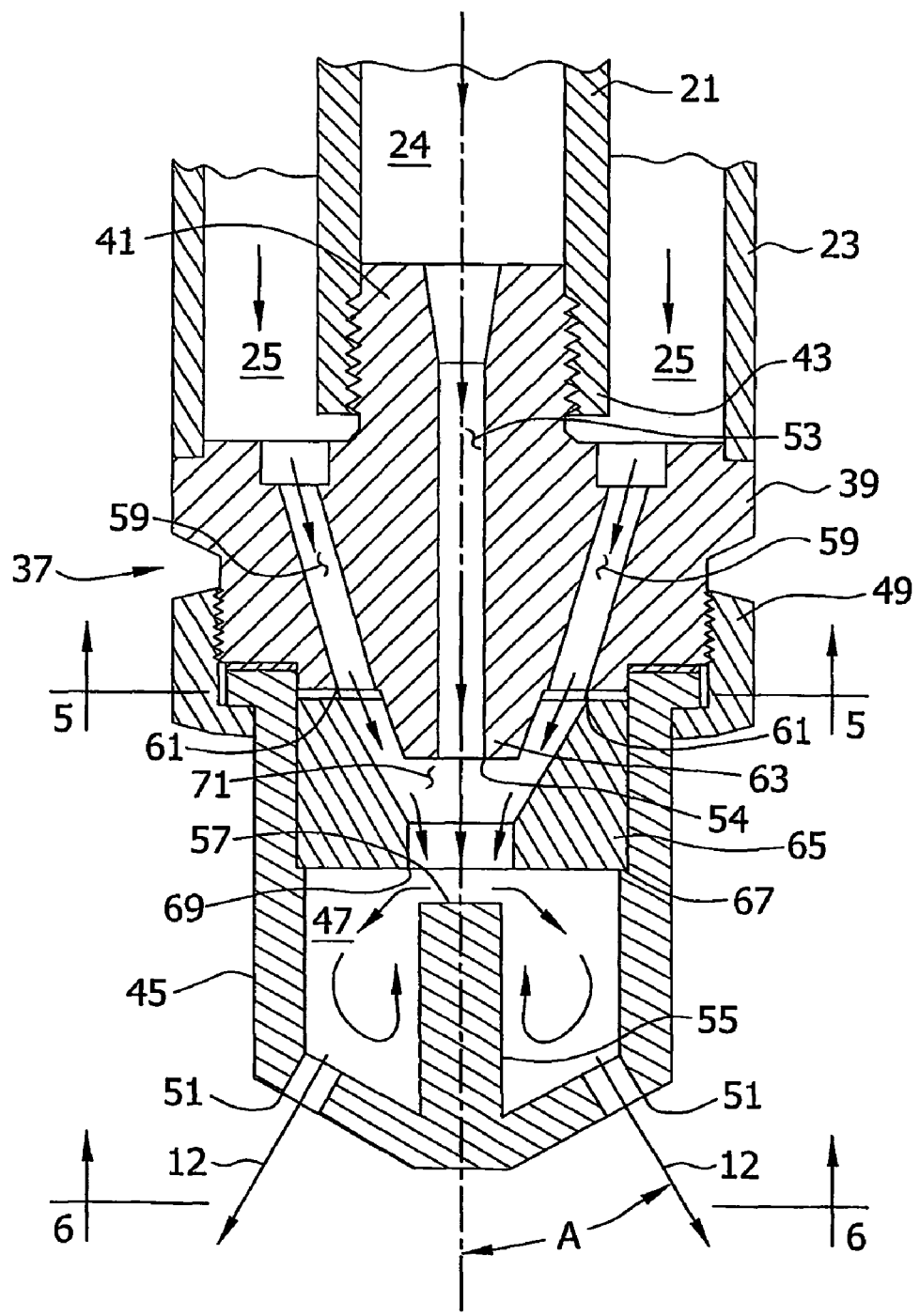
FIG. 4. is an enlarged, fragmentary longitudinal section of a sulfur lance showing a mixing and atomizing nozzle.
Figure 5:
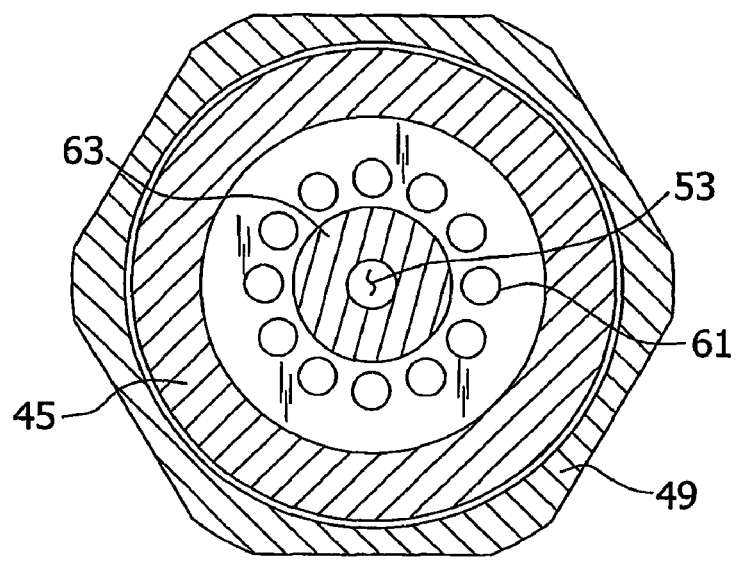
FIG. 5 is a section taken along line 5-5 of FIG. 4.
Figure 6:
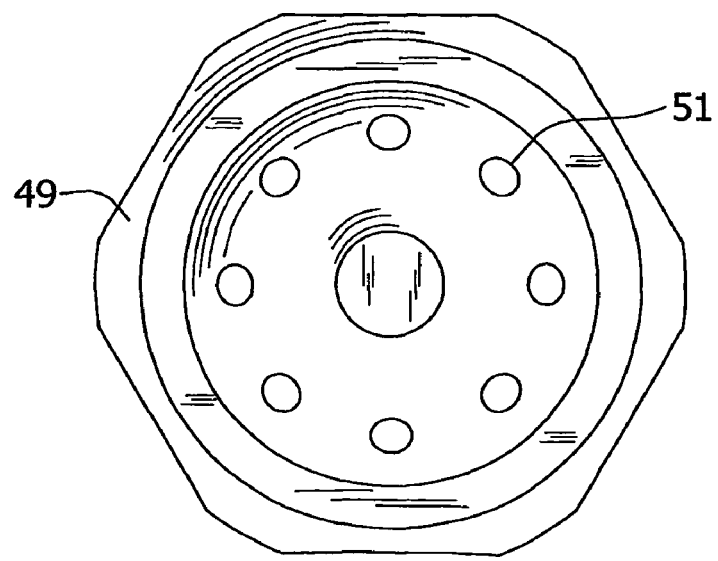
FIG. 6 is an end view of the mixing and atomizing nozzle as seen from the vantage indicate by line 6-6 of FIG. 4.

The downstream or discharge end of lance 11 is provided with a mixing and atomizing nozzle 37. As shown in FIGS. 4-6 and described in greater detail below, the mixing and atomizing nozzle is attached to the lance in a position such that the nozzle communicates with both the inner axial passage 24, through which the flow of pressurized sulfur-containing liquid is supplied to the nozzle, and the outer axial passage 25, through which the flow of pressurized atomizing gas is supplied to the nozzle. While the mixing and atomizing nozzle may have various configurations, one particular configuration found to be suitable in the practice of this invention is that shown in Huffman, U.S. Pat. No. 5,732,885, the entire contents of which are incorporated herein by reference.

The accompanying figures illustrate the use of this patented nozzle in the practice of the present invention. As shown, nozzle 37 comprises a body 39 with an externally threaded neck 41 that is adapted to be attached to the discharge end of inner-conduit 21 which is provided with an internally threaded nozzle adapter 43 such that the body of the nozzle sealingly engages the discharge end of inner and outer conduits 21 and 23. A spray head 45 defining a mixing chamber 47 is positioned below nozzle body 39 and is removably attached to the body by a coupling nut 49. The distal or discharge end of the spray head is formed with one or more discharge or spray apertures 51 through which the mixing chamber in the nozzle communicates with the combustion chamber of the sulfur furnace. The number of spray apertures may vary, but in accordance with one especially preferred embodiment, a plurality of two or more (e.g., at least two, four, six, eight or more) spray apertures are provided in the spray head. A plurality of spray apertures, eight being shown in FIG. 6, may be suitably arranged in a circular pattern in the spray head. In general, the size of the nozzle and the number of spray apertures increases as the design flow rate of the sulfur-containing liquid fed to the lance increases.

Nozzle body 39 is formed with a central and axially extending liquid passage 53 that communicates with inner axial passage 24 defined by inner conduit 21 of the lance and terminates as an axially facing discharge orifice 54. Projecting in an upstream direction (i.e., relative to the flow of sulfur-containing liquid) from the distal or discharge end of spray head 45 within mixing chamber 47 is an impingement member 55 in the form of an elongate pin having a substantially flat upper end surface 57 disposed in axially spaced and opposing relation to liquid discharge orifice 54. Several (e.g., twelve as shown in FIGS. 4 and 5) angularly spaced gas passages 59 are formed through the nozzle body. At their upstream ends, the gas passages communicate with outer axial passage 25 defined by inner and outer conduits 21 and 23 of the lance such that pressurized atomizing gas is injected into the passages. The gas passages converge in a downstream direction (i.e., relative to the flow of the atomizing gas). The downstream ends of the passages define gas outlets 61 located upstream of and around single liquid discharge orifice 54. As described in the aforementioned U.S. Pat. No. 5,732,885, that portion of nozzle body 39 located downstream of the gas outlets defines a nose 63 having a generally frustoconical outer surface that is inclined at approximately the same angle as the gas passages. Liquid discharge orifice 54 opens out of the downstream end of the nose.

A gas guide 65 located within spray head 45 upstream of mixing chamber 47 and downstream of nozzle body 39 functions to contract the jets of atomizing gas issuing from gas outlets 61 into a tubular curtain that surrounds the stream of sulfur-containing liquid discharged out of orifice 54. In one embodiment, the gas guide is formed by an insert located within the upstream end portion of spray head 45 and seated against an upwardly facing shoulder 67 formed around the wall of mixing chamber 47. The downstream end portion of gas guide insert 65 is formed with a cylindrical discharge opening 69 that is located between and is aligned with liquid discharge orifice 54 and impingement member or pin 55. The cross-sectional area of discharge opening 69 is substantially less than the cross-sectional area of mixing chamber 47. As shown in FIG. 4, a recess or bore 71 having a generally frustoconical wall is formed in the insert immediately upstream from discharge opening 69. The upstream end portion of the bore is located immediately adjacent gas outlets 61 and its wall tapers in a downstream direction and joins cylindrical discharge opening 69. The gas outlets open generally axially into the annular space between the generally frustoconical surface of nose 63 and the frustoconical wall of bore 71 in gas guide insert 65. The cone angle of the bore in the gas guide insert may be greater than the cone angle of the nose such that the annular space tapers somewhat in the downstream direction.

Pressurized sulfur-containing liquid introduced into mixing and atomizing nozzle 37 from inner conduit 21 of lance 11 is atomized into fine particles or droplets prior to being discharged into the combustion chamber of the furnace. As described in the aforementioned U.S. Pat. No. 5,732,885, the nozzle preferably atomizes the sulfur-containing liquid in multiple stages so as to enable effective atomization even when the flow rate of sulfur-containing liquid through the nozzle is relatively high. A first stage of atomization is affected mechanically by virtue of the sulfur-containing liquid striking the impingement pin. In particular, the high velocity stream of the sulfur-containing liquid, upon being discharged from liquid orifice 54 into mixing chamber 47, strikes against upper end surface 57 of impingement member 55 to create a distribution of sulfur-containing liquid (i.e., the liquid is broken up into a thin sheet and/or individual particles or droplets).

The distributed sulfur-containing liquid deflected by the impingement member is subjected to a second stage of atomization that is affected pneumatically by the pressurized flow of atomizing gas introduced into mixing and atomizing nozzle 37 through outer axial passage 25 defined by the inner and outer conduits 21 and 23 of lance 11. Jets of high velocity atomizing gas shooting from gas outlets 61 are formed into an annular curtain by the generally frustoconical surface of nose 63 and the frustoconical wall of bore 71 formed in gas guide insert 65. The atomizing gas curtain surrounds the stream of sulfur-containing liquid exiting from liquid discharge orifice 54 and, upon entering cylindrical discharge opening 69, undergoes a substantial increase in velocity. When the high velocity atomizing gas emerges from the opening, it strikes the distribution of sulfur-containing liquid being deflected by impingement member 55 and thus atomizes the liquid or further atomizes the liquid droplets to produce a sulfur combustion mixture comprising particles of the sulfur-containing liquid and the atomizing gas. The open volume of the internal mixing chamber 47 in spray head 45 of nozzle 37 is substantial and thus the atomized sulfur combustion mixture is permitted to expand in the chamber. As a result, there is little tendency for the atomized liquid sulfur particles to coalesce together and reform into larger particles prior to being discharged into the combustion chamber.

A third stage of atomization occurs as the resulting atomized sulfur combustion mixture 12 is discharged from internal mixing chamber 47 of the nozzle through spray apertures 51 into the combustion chamber of the sulfur furnace and the liquid sulfur droplets are atomized even more finely as a result of being released from the pressure within the mixing chamber of the nozzle.

The distal or discharge end of spray head 45 in which spray apertures 51 are formed may be substantially flat or, as shown in FIG. 4, the discharge end of the spray head may be frustoconical (i.e., angled outward) and configured along with the positioning of the spray apertures therein such that the atomized sulfur combustion mixture 12 discharged from each spray aperture is discharged at a spray angle A relative to the central longitudinal axis of the nozzle. Larger spray angles may be employed in larger combustion chamber installations. Generally, however, the spray angle is no greater than about 45°, and for most applications typically ranges from about 20° to about 30° relative to the central longitudinal axis of the nozzle. The spray angle exhibited by the individual sprays discharged from each of the spray apertures is dependent upon the geometry of the discharge end of the spray head and the positioning of the spray apertures formed therein as well as the operating pressures of the sulfur-containing liquid and atomizing gas fed to the sulfur lance.

In order to operate effectively within the combustion chamber environment, including operating temperatures that are typically from about 1,700° to about 2,000° F. (from about 920° to about 1,100° C.), the mixing and atomizing nozzle and other components of the sulfur lance in contact with the process fluids and/or exposed to such conditions are suitably constructed from heat-resistant alloys such as 310SS, 304SS, 316SS or 309SS or similar materials.

For further detail regarding the construction and operation of the mixing and atomizing nozzle described above, reference is made to the aforementioned U.S. Pat. No. 5,732,885. Commercially available examples of suitable mixing and atomizing nozzles include those sold under the trade designation FLOMAX available from Spraying Systems Company (Wheaton, Ill.) in a range of liquid flow capacities from less than 1 gpm (3.785 lpm) to 50 gpm (190 lpm) or more. However, it will be understood that other nozzle configurations and designs may be used for mixing and pneumatically atomizing the sulfur-containing liquid with atomizing gas delivered to the sulfur lance of this invention and the atomization process of this invention may occur in a single step or multiple steps without departing from the scope of this invention. Regardless of the particular atomizing nozzle design employed, it is preferred in the practice of the present invention to use a spray nozzle that internally atomizes the sulfur-containing liquid by mixing the sulfur-containing liquid and the atomizing gas within the nozzle and discharges the resulting sulfur combustion mixture through a plurality of spray apertures. This arrangement produces a relatively dense, compact spray geometry in the form of a plurality of generally symmetrical, cone-shaped sprays that provides the combustion apparatus with substantial capacity or throughput for a given combustion chamber design volume while minimizing power requirements. When using a mixing and atomizing nozzle of the type described in U.S. Pat. No. 5,732,885, the individual cone-shaped sprays discharged from each of the plurality of spray apertures are typically substantially full cone sprays which together may form a hollow or semi-hollow aggregate spray depending upon the degree to which the individual sprays intersect. That is, the individual sprays might eventually intersect one another (depending upon the spray angle) if permitted to traverse a sufficient distance within the combustion chamber. However, it is generally preferred that the combustion apparatus be operated such that the sprays of sulfur-containing liquid particles encounter the flame front within the combustion chamber of the sulfur furnace prior to intersecting adjacent sprays in order to avoid the tendency of the droplets of sulfur-containing liquid to coalesce and form larger particles. Furthermore, the passages for the flows of sulfur-containing liquid and atomizing gas provided in the mixing and atomizing nozzle, such as the discharge aperture(s), are preferably sized large enough to substantially avoid the risk of clogging by contaminants that may be present in molten sulfur and other materials delivered to the lance. Preferably, the minimum dimension of such passages in the nozzle is at least about 0.25 in. (6 mm).

The pneumatic lance is operated in accordance with the present invention to produce a sulfur combustion mixture having a particle size distribution that can be readily controlled to ensure sufficiently rapid vaporization and combustion of the sulfur-containing liquid particles within the design volume of the combustion chamber while minimizing generation of nitrogen oxides and overall power requirements. More particularly, it is preferred that at least about 90% by volume of the particles or droplets of sulfur-containing liquid contained in the atomized sulfur combustion mixture discharged into the combustion chamber have a diameter of less than about 500 µm. However, the median particle diameter (volume or mass basis) of sulfur-containing liquid particles in the atomized sulfur combustion mixture is advantageously maintained above about 50 µm, preferably from about 50 µm to about 150 µm. By median particle diameter it is meant the diameter value at which 50% of the total volume (or mass) of the sulfur-containing liquid sprayed is larger than the median value and 50% smaller than the median value. The median particle diameter or Volume Median Diameter (VMD) is an indication of the average particle or droplet size. Thus, the number of larger diameter particles of sulfur-containing liquid (e.g., in excess of about 500 µm) contained in the sulfur combustion mixture is substantially reduced while controlling the median particle diameter to provide a distribution of particles the bulk of which is populated by more moderately sized particles (e.g., diameters in excess of about 10 µm). In accordance with more preferred embodiments of the present invention, at least about 80% by volume of the atomized particles of sulfur-containing liquid discharged from the lance into the combustion chamber have a diameter of from about 20 µm to about 500 µm, more preferably from about 50 µm to about 500 µm, even more preferably from about 60 µm to about 200 µm, and a median particle diameter (volume or mass basis) of from about 60 µm to about 120 µm, more preferably from about 60 µm to about 100 µm. Droplet diameter data for a sulfur combustion mixture can be readily determined experimentally using laboratory test apparatus such as a TSI two-dimensional 2D Phase Doppler Analyzer (PDPA) with a suitable light source (e.g., a 300 mwatt Argon-Ion laser) and established test protocols known in the art to accurately measure droplet sizes ranging from submicron to 1000 µm.

Operation of the pneumatic atomization system of the present invention within these particle size regimes provides a sulfur combustion mixture that is readily vaporized and combusted within the design volume of the combustion chamber while avoiding excessive power requirements associated with needlessly atomizing the sulfur-containing liquid to an even finer particle size distribution.

In addition, the pneumatic atomization and combustion process disclosed herein can be employed to desirably suppress the production of nitrogen oxides in the sulfur dioxide-containing combustion gas. Many factors affect the formation of nitrogen oxides. Several of these factors are positively influenced by operating the sulfur combustion apparatus to produce an atomized sulfur combustion mixture exhibiting a particle size distribution in accordance with the present invention. By significantly reducing the population of larger diameter sulfur-containing particles or droplets in the atomized sulfur combustion mixture (particularly as compared to hydraulically-operated sulfur lances) the flame temperature at the point where liquid sulfur is visibly producing light radiation (i.e., the flame front) is decreased. This phenomenon has been confirmed through computational fluid dynamics analysis. As apparent to those skilled in the art, decreasing the flame temperature reduces the formation of nitrogen oxides in the combustion chamber. Moreover, by producing a sulfur combustion mixture dominated by relatively moderately sized sulfur droplets (e.g., at least about 80% by volume having a diameter of from about 20 µm to about 500 µm), more even, continuous combustion takes place, thus utilizing the available oxygen content within the combustion chamber more evenly. This minimizes locations within the combustion chamber were excess oxygen may exist and otherwise exacerbate the production of nitrogen oxides. More even consumption of the available oxygen and minimizing excess oxygen within the combustion chamber near the flame front also reduces the flame temperature in part because less excess oxygen is available.

In accordance with one preferred embodiment of the pneumatic atomization and combustion process of the present invention to generate a combustion gas having a sulfur dioxide gas strength of from about 8 to about 14 mole %, more typically, from about 9 to about 12 moles, the combustion gas contains no more than about 20 ppmv nitrogen oxides, preferably no more than about 15 ppmv nitrogen oxides, more preferably no more than about 10 ppmv nitrogen oxides and even more preferably no more than about 5 ppmv nitrogen oxides.

The particle size distribution and median particle diameter exhibited by the atomized sulfur combustion mixture discharged into the combustion chamber of the furnace is readily controlled by manipulating the ratio of the pressure of the sulfur-containing liquid to the pressure of the atomizing gas supplied to the nozzle of the sulfur lance. Generally, the population of larger diameter particles and the mean or average particle diameter are diminished as the ratio of the sulfur-containing liquid supply pressure to the atomizing gas supply pressure decreases. As will be appreciated, suitable supply pressures for the sulfur-containing liquid and atomizing gas necessary to achieve adequate atomization is dependent in part on the design flow capacity of the nozzle and its atomizing characteristics. By way of example, in the case of pneumatic atomization of molten sulfur using a mixing and atomizing nozzle of the type illustrated in the accompanying figures, when the design flow rate of sulfur delivered to the nozzle ranges from about 19 to about 38 gpm (from about 72 to about 143 lpm), suitable results are achieved utilizing a sulfur supply pressure of at least about 60 psig (410 kPa), preferably from about 65 to about 85 psig (from about 450 to about 590 kPa) and a flow rate of pressurized atomizing gas (e.g., air) of from about 60 to about 160 SCFM (from about 1,700 to about 4,530 SLPM) at a pressure of generally comparable magnitude, typically at least about 60 psig (410 kPa), preferably from about 70 to about 100 psig (from about 480 to about 690 kPa). In such an application, and similar applications at other design sulfur flow rates and using mixing and atomizing nozzles of varying designs, the optimum ratio of sulfur supply pressure to atomizing air supply pressure delivered to the nozzle necessary to achieve the favorable droplet diameter characteristics disclosed herein and the attendant benefit of reduced nitrogen oxides production can be readily established through routine experimentation.

The pneumatically-operated sulfur lance described herein is readily designed and adapted to provide a turndown ratio of at least about 10:1. The control and flexibility of the pneumatically-operated sulfur lance in accordance with the present invention over a broad range of sulfur flow rates provides the operator with excellent turndown/turnup capabilities when adjusting production rates.

The resulting sulfur dioxide-containing combustion gas passed from the combustion chamber of the sulfur furnace may be fed to a conventional contact sulfuric acid plant such that the sulfur dioxide contained in the combustion gas is ultimately recovered as concentrated sulfuric acid and/or oleum. Contact sulfuric acid plants and the various apparatus and process operation techniques employed therein are known to those skilled in the art and may be suitably implemented in conjunction with the sulfur-containing liquid combustion system disclosed herein.

The sulfur dioxide-containing combustion gas exiting the sulfur furnace may be directed to a waste heat boiler to generate steam or otherwise recover heat energy for useful application elsewhere in the plant. If a sufficient excess of combustion air or other oxygen-containing gas is not fed to the combustion furnace, additional air or other oxygen-containing gas may be mixed with the combustion gas to produce a converter feed gas stream containing at least about 0.5 moles, preferably at least about 0.75 moles of oxygen, more preferably about 0.75 to about 1.3 moles oxygen, per mole of sulfur dioxide. The converter feed gas stream is introduced into a catalytic converter wherein the feed gas mixture is passed over a suitable catalyst (e.g., vanadium or cesium-vanadium) for the oxidation of sulfur dioxide to sulfur trioxide, thereby producing a conversion gas comprising sulfur trioxide. Typically, sulfur dioxide is converted to sulfur trioxide in a catalytic converter containing a plurality (e.g., four) of catalyst beds or stages, each containing a suitable conversion catalyst for the progressive conversion of sulfur dioxide to sulfur trioxide. The converter feed gas may be dried by contacting the gas with concentrated sulfuric acid in a drying tower prior to introducing the gas into the converter. Preferably, the sulfur dioxide gas strength of the combustion gas is sufficient for autothermal operation of the contact acid unit and control of acid unit water balance. For example, the sulfur dioxide gas strength of the combustion gas is preferably sufficient to provide a gas strength of at least about 8 percent by volume in the converter feed gas stream. Where the sulfur dioxide content of the converter feed gas is 8 percent by volume or higher, the ratio of inerts to sulfur dioxide is low enough that transfer of heat from the conversion gas to the converter feed gas is sufficient, without need for any extraneous heat source, to bring the converter feed gas to a temperature high enough to initiate a self-sustaining conversion reaction in the catalytic converter. Typically, reaction heat is recovered in useful form by cooling the process gas stream exiting the catalyst stages of the converter.

The conversion gas is then contacted with an aqueous solution of sulfuric acid in the absorption zone of a sulfur trioxide absorber to absorb sulfur trioxide from the conversion gas and to form additional sulfuric acid and/or oleum and tail gas stream comprising sulfur trioxide absorber depleted gas. In order to control sulfur dioxide emissions, high capacity sulfuric acid plants are commonly operated using the dual absorption process. In a double absorption plant, the partially converted process gas stream leaving the second or third catalyst bed is passed through an intermediate absorber (i.e., an interpass absorber) for removal of sulfur trioxide in the form of product acid. Gas exiting the intermediate absorber is returned to the next bed of the catalytic converter. Since the conversion of sulfur dioxide to sulfur trioxide is an equilibrium reaction, removal of sulfur trioxide in the interpass absorber helps drive the reaction forward in the last bed or beds of the converter to achieve high conversions and thereby control sulfur dioxide emissions in the tail gas exiting the final sulfur trioxide absorber.

Even with double absorption, the catalytic converter is generally sized conservatively to assure high conversions and consequently low sulfur dioxide emissions. Emission standards generally require that at least 99.7 percent of the sulfur dioxide entering the converter be recovered in the form of sulfuric acid, i.e., that no more than 0.3 percent of the entering sulfur dioxide exit the system in the sulfur trioxide absorber tail gas.

In addition to molten sulfur, the pneumatic atomization techniques disclosed herein may be utilized to produce a sulfur combustion mixture from a wide variety of other sulfur-containing liquids. For example, the sulfur-containing liquid atomized for injection into the combustion chamber of the sulfur furnace to form a combustion gas comprising sulfur dioxide may contain various sulfur-containing raw materials or components including, without limitation, decomposable sulfates such as ammonium sulfate, ammonium bisulfate, calcium sulfate, ferrous sulfate, methyl sulfate and sulfuric acid (e.g., spent or otherwise contaminated or diluted sulfuric acid) typically in aqueous solution. Various sulfide-containing liquids such as disulfide oils as well as sulfur-containing liquids containing mixtures of these various sulfur components may also be atomized in the practice of the invention. As apparent to those skilled in the art, depending on the composition of the sulfur-containing liquid, the practice of the present invention is suitably modified to accommodate combustion of these diverse sulfur feed mixtures, for example, by the introduction of a carbonaceous material (i.e., a fuel) into the combustion zone of the sulfur furnace to provide the heat necessary to evaporate water, decompose or burn the sulfur source and produce a sulfur dioxide combustion gas of the desired composition. Accordingly, it should also be recognized that the process of this invention may be practiced to produce a sulfur dioxide-containing combustion gas with a wide range of sulfur dioxide concentrations. As suggested above, in some embodiments, the various aspects of the invention are applied in conjunction with other manufacturing processes that either need to reduce or eliminate the sulfur content in a particular material, or need to reduce or eliminate a sulfur-containing material or component of a waste stream such as spent sulfuric acid and other sulfate and sulfide-containing liquids. In most such sulfur salvage applications, the sulfur dioxide concentration in the resulting combustion gas is typically less than about 11 mole %, and more typically from about 7 to about 9 molet and the downstream processing of the combustion gas is modified accordingly.

When subjecting sulfur-containing liquids other than molten sulfur to the pneumatic atomization process as disclosed herein, the differing viscosities of such materials will affect the particle size characteristics of the sulfur combustion mixture discharged from the sulfur lance. Nevertheless, the advantages of controlling the particle size distribution to substantially reduce the component of larger diameter droplets of sulfur-containing liquid and providing a sulfur combustion mixture exhibiting a desirable median particle diameter as disclosed herein can be readily achieved by proper modification of the sulfur-containing liquid and atomizing gas supply pressures. Although the particle size characteristics of the sulfur combustion mixture is suitably controlled by adjusting the ratio of the sulfur-containing liquid supply pressure to the atomizing gas supply pressure with a lower ratio generally reducing the population of larger diameter particles and the mean or average particle diameter, when atomizing a sulfur-containing liquid less viscous than molten sulfur, the magnitude of the supply pressures to the lance are typically diminished. Moreover, the materials of construction for the mixing and atomizing nozzle and other components of the pneumatically-operated lance when used to atomize sulfur-containing liquids other than molten sulfur may be selected accordingly to provide adequate protection from corrosion and other aspects of the process environment. For example, when spent sulfuric acid is pneumatically atomized in accordance with the present invention, the mixing and atomizing nozzle and other components of the lance may be suitably constructed from various alloys such as HASTELLOY and ALLOY 20 stainless steel.

Although in a preferred embodiment, air is used as the atomizing gas fed to the pneumatically-operated sulfur lance, other oxygen-containing gases of various compositions may be utilized as well as other gases. In addition, the atomizing gas may comprise pressurized steam. For example, steam may be utilized as a component of the atomizing gas to produce a combustion gas comprising sulfur dioxide and appreciable concentrations of water vapor (i.e., wet gas) suitable for use in the manufacture of sulfuric acid by the contact process as described, for example, in U.S. Pat. No. 5,130,112, the entire contents of which are incorporated herein by reference. Steam from a variety of sources may be used as a component of the pressurized atomizing gas fed to the sulfur lance. Such sources include, for example, boiler blow down flash, deaerator vent steam, the low pressure port on a steam turbine for an electrical generator, steam generated from low temperature sulfuric acid, heat recovery absorption system steam as well as steam from outside the sulfuric acid plant. In such an embodiment, at least a portion of the water vapor introduced into the sulfur dioxide-containing combustion gas as a component of the atomizing gas is subsequently reacted with sulfur trioxide in the gas phase to produce sulfuric acid and thereby generate the heat of formation of sulfuric acid in the gas phase. The heat energy from the vapor phase heat of formation of sulfuric acid may then be advantageously recovered by transfer of heat from the process gas stream to a heat transfer fluid in one or more indirect heat exchangers. For example, a substantial fraction of the heat energy from the vapor phase heat of formation of sulfuric acid may be recovered by passing the partially converted process gas stream exiting an intermediate catalyst bed (e.g., from the second or third catalyst stage) of the catalytic converter through a shell and tube type heat exchanger (e.g., an economizer) fed with feed water for the waste heat boiler as the heat transfer fluid before passing the cooled gas stream through the intermediate absorber (i.e., interpass absorber) of a heat recovery system. The economizer comprises heat transfer wall means between the process gas stream and the boiler feed water and may be operated such that at least a portion of the heat transfer wall means on the gas side thereof is at a temperature below the dew point of the process gas stream entering the economizer to cause condensation thereon. Operation in this manner allows a high portion of the gas phase heat of formation and an appreciable fraction of the heat of condensation of sulfuric acid to be recovered in useful form. Such an embodiment may optionally further comprise first transferring heat contained in the partially converted process gas stream to steam generated in the waste heat boiler by passing the process gas stream through an indirect heat exchanger (e.g., a superheater) located between the catalytic converter and the economizer with respect to the direction of gas flow to impart superheat to the steam generated in the waste heat boiler. As will be appreciated by those skilled in the art, the quantity of steam introduced into the system as a component of the atomizing gas is typically quite small and, therefore, the energy recovery from the vapor phase heat of formation of sulfuric acid produced from this source of steam will be relatively modest. However, additional steam or water vapor may be introduced into the process gas stream at one or more locations between the sulfur burner and the absorber to further augment heat energy recovery from the vapor phase heat of formation of sulfuric acid as taught in the aforementioned U.S. Pat. No. 5,130,112.

It should be recognized that the present invention has application both in the design and construction of new apparatus for the combustion of sulfur-containing liquids as well as in the retrofit of existing apparatus. For example, a combustion apparatus having at least one hydraulically-operated sulfur lance supplied with a pressurized source of molten sulfur or other sulfur-containing liquid, may be retrofitted in accordance with the present invention. In order to retrofit the apparatus, a pressurized source of air or other atomizing gas is provided at the site. At least one pneumatically-operated sulfur lance including a mixing and atomizing nozzle as described above is connected to the pressurized supply of atomizing gas and sulfur-containing liquid and positioned so as to discharge a pneumatically atomized sulfur combustion mixture comprising particles of the sulfur-containing liquid and atomizing gas into the combustion chamber of the apparatus. Generally, the operating pressure for the supply of sulfur-containing liquid fed to the pneumatically-operated sulfur lance is generally adjusted lower as compared to a hydraulically-operated sulfur lance. Retrofit of a combustion apparatus may include replacing one or more existing hydraulically-operated sulfur lances with one or more pneumatically-operated lances in accordance with the present invention and/or adding one or more pneumatically-operated lances to an exiting installation.

The following Examples are simply intended to further illustrate and explain the present invention. The invention, therefore, should not be limited to any of the details in the Examples.

EXAMPLE 1

A pneumatically-operated sulfur lance in accordance with the present invention was tested in a combustion apparatus that burns molten sulfur to generate sulfur dioxide for the production of sulfuric acid. The sulfur lance included a mixing and atomizing spray nozzle of the type described above (FLOMAX, FM25 available from Spraying Systems Company, Wheaton, Ill.) and was supplied with pressurized molten sulfur and undried ambient air as the atomizing gas.

During the test period, the sulfur lance was operated at two different sulfur flow rates. The sulfur feed rate was initially set at about 12 gpm (45 lpm), then increased to about 23 gpm (87 lpm) after which it was decreased back to about 12 gpm (45 lpm). The duration of the test run lasted 95 minutes.

The principal tool used for gauging the degree of atomization was visual examination of the sulfur flame. Visual observations were made and digital photographs were taken at each of the test conditions. The conditions and data recorded during the test period are as follows.

For operation at 12 gpm (45 lpm), the molten sulfur and air supply pressures were set at approximately 61 psig (420 kPa) and 65 psig (450 kPa), respectively. The supply pressures for the two media correlate to molten sulfur and air flow rates of about 12 gpm (45 lpm) and about 75 SCFM (2,120 SLPM), respectively. The invention was operated for a total of 65 minutes at these test conditions.

Figure 7:
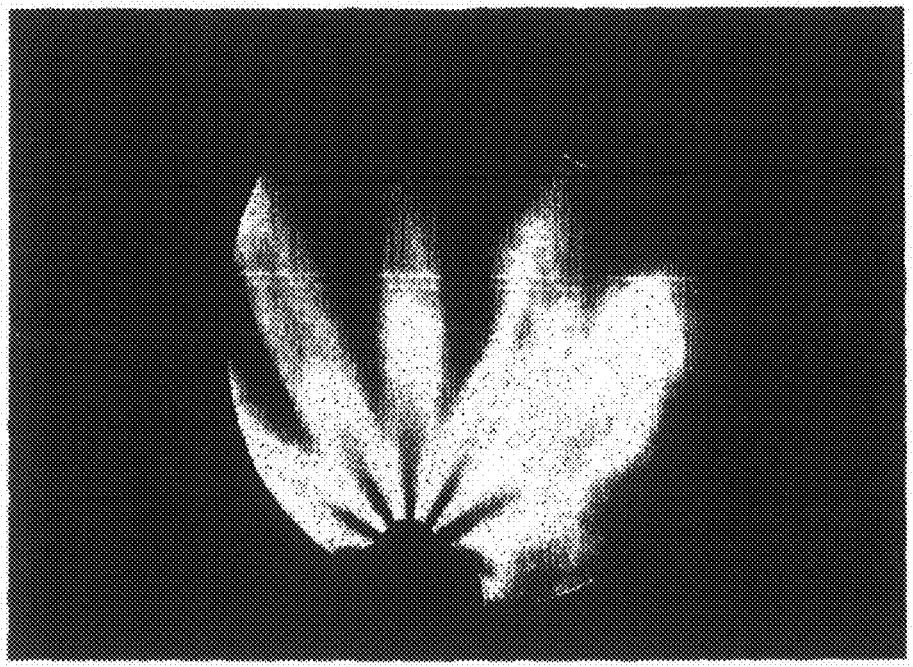
FIG. 7 is a photograph of the sulfur flame from the front of the sulfur furnace adjacent the discharge end of the sulfur lance looking toward the rear of the combustion chamber while operating the sulfur lance at a sulfur flow rate of approximately 12 gpm (45 lpm) in Example 1.

While operating at the aforementioned conditions, the overall flame quality produced was excellent with a blue to violet color. FIG. 7 shows a photograph of the sulfur flame from the front of the sulfur furnace adjacent the discharge end of the sulfur lance looking toward the rear while operating the lance at the 12 gpm (45 lpm) sulfur flow rate. The sulfur flame was approximately 9 ft (2.7 m) in diameter and from about 5 to about 8 ft (from about 1.5 to about 2.4 µm) in length. The flame profile was a uniform conical shape with even flame distribution around the perimeter and little to no pulsation. Sulfur was fully combusted prior to reaching first baffle wall of the combustion chamber, which was located approximately 23 ft (7 m) from the nozzle tip.

For operation of the sulfur lance at a flow rate of 23 gpm (87 lpm), the molten sulfur and air pressures were set at approximately 65 psig (450 kPa) and 30 psig (210 kPa), respectively. The supply pressures for the two media correlate to molten sulfur and air flow rates of about 23 gpm (87 lpm) and about 16 SCFM (450 SLPM), respectively. The invention was operated for a total of 15 minutes at these test conditions.

Figure 8:
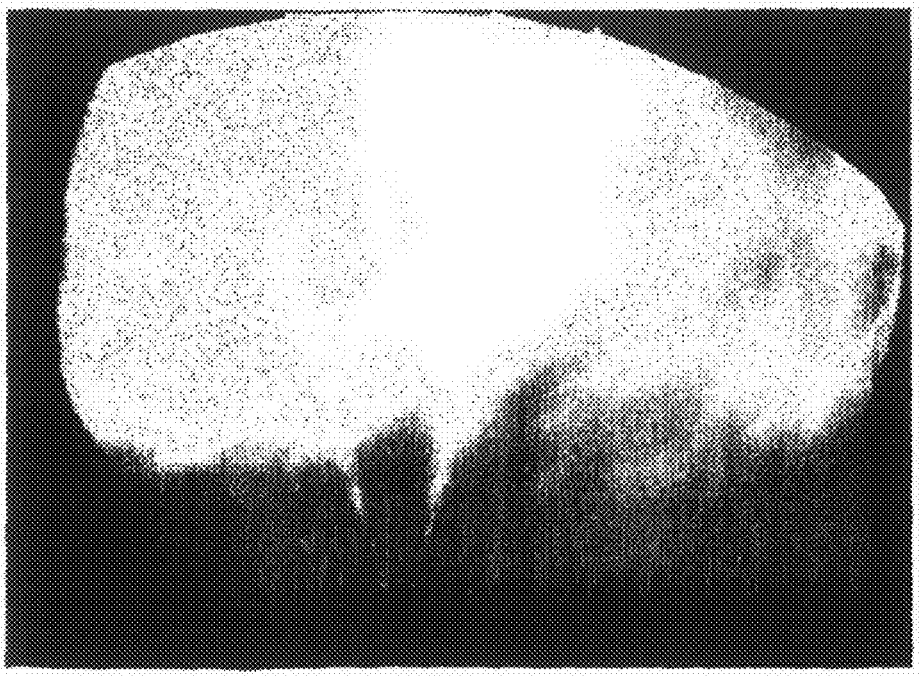
FIG. 8 is a photograph of the sulfur flame from the front of the sulfur furnace adjacent the discharge end of the sulfur lance looking toward the rear of the combustion chamber while operating the sulfur lance at a sulfur flow rate of approximately 23 gpm (87 lpm) in Example 1.

While operating at the aforementioned conditions, the overall flame quality produced was excellent with a mostly violet color. FIG. 8 provides a photograph of the sulfur flame from the front of the sulfur furnace adjacent the discharge end of the sulfur lance looking toward the rear while operating the lance at the 23 gpm (87 lpm) sulfur flow rate. The sulfur flame was approximately 13 ft (4 m) in diameter and from about 9 to about 15 ft (from about 2.7 to about 4.6 m) in length. The flame profile was fairly conical in shape with some variation in flame distribution and noticeable pulsation. Sulfur was fully combusted greater than 90% of the time prior to reaching first baffle wall.

The results of the test illustrate the ability of the present invention to handle a wide operating range of sulfur flows while maintaining superior sulfur combustion. The control and flexibility of the invention over a broad collection of sulfur flow rates provides the operator with excellent turndown/turnup capabilities when adjusting production rates.

EXAMPLE 2

A pneumatically-operated sulfur lance in accordance with the present invention was tested to assess nitrogen oxide formation. The pneumatically-operated sulfur lance was installed in a combustion apparatus that burns molten sulfur to generate a combustion gas comprising sulfur dioxide used in the production of sulfuric acid at a contact sulfuric acid production facility. The pneumatically-operated sulfur lance included a mixing and atomizing spray nozzle of the type described above (FLOMAX, FM25 available from Spraying Systems Company, Wheaton, Ill.) and was supplied with pressurized molten sulfur and undried ambient air as the atomizing gas.

During the test period, the pneumatically-operated sulfur lance was operated at an approximate sulfur flow rate of 35 gpm (132 lpm). As a comparison, two standard hydraulically-operated sulfur lances were also tested in the combustion apparatus of the sulfuric acid plant at an approximate total sulfur flow rate of 35 gpm (132 lpm).

The principal tool used for gauging the degree of formation of nitrogen oxides on a volume basis was analysis of the gases exiting the sulfuric acid plant stack (i.e., the tail gas exiting the final sulfur trioxide absorption tower). Nitrogen oxide content of the tail gases exiting the sulfuric acid plant stack can be readily determined using laboratory test equipment and established test protocols known in the art. In this Example, a Thermo Electron model 42 CLS nitrogen oxide analyzer calibrated using two cylinders of EPA protocol calibration gas was employed to analyze the sulfuric acid plant tail gas. The first cylinder contained 48.44 ppmv of NO and 48.44 ppmv of total nitrogen oxides and the second cylinder contained 7.994 ppmv of NO and 8.042 ppmv of total nitrogen oxides, with $N_2$ as balance gas. The analyzer was calibrated with the first cylinder and checked with the second cylinder. After calibration with the first cylinder, the analyzer displayed 7.97 ppmv NO and 8.02 ppmv total nitrogen oxides for the second cylinder, indicating that the instrument was accurate and linear. Teflon tubings were used to connect the instrument to a sampling port at the top of the final sulfur trioxide absorption tower above the mist eliminator. A self-made sample gas filter was installed in the sampling line to remove particles and acid mist. Samples of the plant tail gas were taken and analyzed and calculations were performed to determine the amount of nitrogen oxides at each of the test conditions. The conditions and data recorded during the two test periods are set forth below.

During the first test conducted using the two standard hydraulically-operated sulfur lances operated at a total sulfur flow rate of approximately 35 gpm (132 lpm), the combustion chamber operating temperature was 926° C. and the oxygen content of the plant tail gas was 9.30% of the total gas flow exiting the stack. The two standard hydraulically-operated sulfur lances were operated for a total of 30 minutes at these test conditions. While operating at the aforementioned conditions, the total nitrogen oxides content of the sulfuric acid plant tail gas was 11.6 ppmv.

During the second test conducted using the single pneumatically-operated sulfur lance in accordance with the present invention operated at a sulfur flow rate of approximately 35 gpm (132 lpm), the combustion chamber operating temperature was 930° C. and the oxygen content of the plant tail gas was 7.10% of the total gas flow exiting the stack. The pneumatically-operated sulfur lance was operated for a total of 51 minutes at these test conditions. While operating at the aforementioned conditions, the total nitrogen oxides content of the sulfuric acid plant tail gas was 9.3 ppmv. This represents nearly a 20% reduction in nitrogen oxide levels attained using the pneumatically-operated sulfur lance in accordance with the present invention as compared to the hydraulically-operated sulfur lances.

The results of this Example illustrate the ability of the present invention to effectively reduce the level of nitrogen oxides in the tail gas exiting a sulfuric acid plant stack.

The above description of the preferred embodiments is intended only to acquaint others skilled in the art with the invention, its principles, and its practical application, so that others skilled in the art may adapt and apply the invention in its numerous forms, as may be best suited to the requirements of a particular use. The present invention, therefore, is not limited to the above embodiments, and may be variously modified.

With reference to the use of the word(s) "comprise" or "comprises" or "comprising" in this specification, including the appended claims, unless the context requires otherwise, those words are used on the basis and clear understanding that they are to be interpreted inclusively, rather than exclusively, and that it is intended each of those words to be so interpreted in construing this specification.

What is claimed is:

1. Apparatus for the combustion of a sulfur-containing liquid to produce a combustion gas comprising sulfur dioxide, the apparatus comprising:
  a furnace comprising a combustion chamber;
  a pressurized source of the sulfur-containing liquid;
  a pressurized source of an atomizing gas; and
  at least one sulfur lance positioned for discharging an atomized sulfur combustion mixture comprising particles of the sulfur-containing liquid and atomizing gas into said combustion chamber wherein the sulfur-containing liquid particles are combusted in the presence of oxygen to produce the combustion gas comprising sulfur dioxide, said sulfur lance comprising a mixing and atomizing nozzle directed into said combustion chamber, a first conduit communicating with said pressurized source of sulfur-containing liquid and said nozzle and a second conduit communicating with said pressurized source of atomizing gas and said nozzle, said nozzle being adapted for mixing the sulfur-containing liquid and the atomizing gas to form the atomized sulfur combustion mixture and having a plurality of spray apertures therein through which the atomized sulfur combustion mixture is discharged under pressure into said combustion chamber.

2. The apparatus as set forth in claim 1 wherein said mixing and atomizing nozzle has at least four spray apertures.

3. The apparatus as set forth in claim 2 wherein said plurality of spray apertures of said mixing and atomizing nozzle are arranged in a circular pattern.

4. The apparatus as set forth in claim 2 wherein said first conduit is disposed within and concentric with said second conduit, the first conduit defining an inner axial passage for flow of the sulfur-containing liquid and the first and second conduits defining an outer axial passage for flow of the atomizing gas.

5. The apparatus as set forth in claim 4 wherein said mixing and atomizing nozzle comprises a spray head having said plurality of spray apertures formed therein, a chamber in said spray head, and an impingement member protruding from said spray head into said spray head chamber at a location generally opposite said inner axial passage through which the sulfur-containing liquid is passed into said nozzle whereby the flow of sulfur-containing liquid is directed against said impingement member.

6. The apparatus as set forth in claim 5 wherein said plurality of spray apertures are formed in a distal surface of said spray head.

7. The apparatus as set forth in claim 6 wherein at least six spray apertures are formed in said distal surface of said spray head.

8. The apparatus as set forth in claim 6 wherein at least eight spray apertures are formed in said distal surface of said spray head.

9. The apparatus as set forth in claim 6 wherein said plurality of spray apertures formed in said distal surface of said spray head are arranged in a circular pattern.

10. The apparatus as set forth in claim 6 wherein said mixing and atomizing nozzle and said plurality of spray apertures formed in said distal surface of said spray head are adapted and configured to discharge the atomized sulfur combustion mixture into said combustion chamber in the form of a plurality of generally symmetrical, cone-shaped sprays.

11. The apparatus of claim 6 wherein said distal surface of said spray head having said plurality of spray apertures formed therein is angled outward from the central longitudinal axis of said mixing and atomizing nozzle.

12. The apparatus of claim 11 wherein said mixing and atomizing nozzle and said plurality of spray apertures formed in said distal surface of said spray head are configured for discharging the atomized sulfur combustion mixture at a spray angle of from about 20° to about 30° relative to the central longitudinal axis of said nozzle.

13. The apparatus as set forth in claim 2 wherein said combustion chamber is free of baffles.

14. The apparatus as set forth in claim 2 wherein said sulfur lance has a turndown ratio of at least about 10:1.

15. The apparatus as set forth in claim 2 wherein said pressurized source of the sulfur-containing liquid comprises a sulfur component selected from the group consisting of molten sulfur, ammonium sulfate, ammonium bisulfate, ferrous sulfate, methyl sulfate, sulfuric acid, disulfide oil and mixtures thereof.

16. The apparatus as set forth in claim 2 wherein said pressurized source of the sulfur-containing liquid comprises molten sulfur.

17. The apparatus as set forth in claim 2 wherein said pressurized source of the atomizing gas comprises oxygen.

18. The apparatus as set forth in claim 17 wherein said pressurized source of the atomizing gas comprises undried ambient air.

19. The apparatus as set forth in claim 2 wherein said pressurized source of the atomizing gas comprises steam.

20. The apparatus as set forth in claim 2 comprising a plurality of said sulfur lances positioned for discharging the atomized sulfur combustion mixture comprising particles of the sulfur-containing liquid and atomizing gas into said combustion chamber to produce the combustion gas comprising sulfur dioxide.

21. The apparatus as set forth in claim 1 wherein said mixing and atomizing nozzle has at least six spray apertures.

22. The apparatus as set forth in claim 1 wherein said mixing and atomizing nozzle has at least eight spray apertures.

23. A process for the combustion of a sulfur-containing liquid to produce a combustion gas comprising sulfur dioxide, the process comprising:
  introducing a flow of pressurized sulfur-containing liquid and a flow of pressurized atomizing gas into at least one sulfur lance comprising first and second conduits communicating with a mixing and atomizing nozzle having a plurality of spray apertures therein;
  passing the pressurized sulfur-containing liquid through said first conduit and the pressurized atomizing gas through said second conduit into said mixing and atomizing nozzle;
  passing the pressurized sulfur-containing liquid and the pressurized atomizing gas through said mixing and atomizing nozzle to affect atomization of the sulfur-containing liquid and form an atomized sulfur combustion mixture comprising particles of sulfur-containing liquid and atomizing gas discharged under pressure through said plurality of spray apertures into a combustion chamber of a furnace; and
  combusting the sulfur-containing liquid particles in the presence of oxygen in said combustion chamber to produce the combustion gas comprising sulfur dioxide.

24. The process as set forth in claim 23 wherein the atomized sulfur combustion mixture is discharged into said combustion chamber through said plurality of spray apertures in the form of a plurality of generally symmetrical, cone-shaped sprays.

25. The process as set forth in claim 23 wherein at least about 90% by volume of the particles of sulfur-containing liquid contained in the atomized sulfur combustion mixture discharged into said combustion chamber have a diameter of less than about 500 μm.

26. The process as set forth in claim 25 wherein the median particle diameter (volume or mass basis) of sulfur-containing liquid particles in the atomized sulfur combustion mixture discharged into said combustion chamber is from about 50 μm to about 150 μm.

27. The process as set forth in claim 26 wherein the median particle diameter (volume or mass basis) of sulfur-containing liquid particles in the atomized sulfur combustion mixture discharged into said combustion chamber is from about 60 µm to about 120 µm.

28. The process as set forth in claim 27 wherein the median particle diameter (volume or mass basis) of sulfur-containing liquid particles in the atomized sulfur combustion mixture discharged into said combustion chamber is from about 60 µm to about 100 µm.

29. The process as set forth in claim 26 wherein the pressurized sulfur-containing liquid comprises a sulfur component selected from the group consisting of molten sulfur, ammonium sulfate, ammonium bisulfate, ferrous sulfate, methyl sulfate, sulfuric acid, disulfide oil and mixtures thereof.

30. The process as set forth in claim 26 wherein the pressurized sulfur-containing liquid comprises molten sulfur.

31. The process as set forth in claim 26 wherein the pressurized atomizing gas comprises oxygen.

32. The process as set forth in claim 31 wherein the pressurized atomizing gas comprises undried ambient air.

33. The process as set forth in claim 26 wherein the pressurized atomizing gas comprises steam.

34. The process as set forth in claim 26 wherein the ratio of the volume of said combustion chamber to the flow rate of the atomized sulfur combustion mixture discharged into said combustion chamber is at least about 0.5 seconds.

35. The process as set forth in claim 34 wherein the ratio of the volume of said combustion chamber to the flow rate of the atomized sulfur combustion mixture discharged into said combustion chamber is from about 0.5 seconds to about 1.1 seconds.

36. The process as set forth in claim 35 wherein the ratio of the volume of said combustion chamber to the flow rate of the atomized sulfur combustion mixture discharged into said combustion chamber is from about 0.5 seconds to about 0.65 seconds.

37. The process as set forth in claim 26 wherein said combustion chamber is free of baffles.

38. The process as set forth in claim 26, the process further comprising:
catalytically oxidizing sulfur dioxide contained in a converter feed gas comprising the sulfur dioxide containing combustion gas and oxygen in a catalytic converter containing an oxidation catalyst effective for oxidizing sulfur dioxide to sulfur trioxide to form a conversion gas comprising sulfur trioxide; and
contacting the conversion gas with an aqueous solution of sulfuric acid in a sulfur trioxide absorption zone to form additional sulfuric acid and/or oleum.

39. The process as set forth in claim 38 wherein pressurized atomizing gas comprises steam.

40. The process as set forth in claim 39 wherein at least a portion of the water vapor introduced into the sulfur dioxide-containing combustion gas as a component of the pressurized atomizing gas is reacted with sulfur trioxide in the gas phase to produce sulfuric acid and thereby generate the heat of formation of sulfuric acid in the gas phase.

41. The process as set forth in claim 40 further comprising recovering heat energy from the vapor phase heat of formation of sulfuric acid by transfer of heat from a process gas stream comprising the sulfuric acid produced to a heat transfer fluid in one or more indirect heat exchangers.

42. The process as set forth in claim 25 wherein control of the particle size of the sulfur-containing liquid particles in the atomized sulfur combustion mixture discharged into said combustion chamber comprises adjusting the ratio of the pressure of the sulfur-containing liquid introduced into said sulfur lance to the pressure of said atomizing gas introduced into said sulfur lance.

43. The process as set forth in claim 23 wherein at least about 80% by volume of the particles of sulfur-containing liquid contained in the atomized sulfur combustion mixture discharged into said combustion chamber have a diameter of from about 50 µm to about 500 µm.

44. The process as set forth in claim 43 wherein at least about 80% by volume of the particles of sulfur-containing liquid contained in the atomized sulfur combustion mixture discharged into said combustion chamber have a diameter of from about 60 µm to about 200 µm.

45. The process as set forth in claim 23 wherein said first conduit is disposed within and concentric with said second conduit, the first conduit defining an inner axial passage for flow of the sulfur-containing liquid and the first and second conduits defining an outer axial passage for flow of the atomizing gas.

46. The process as set forth in claim 45 further comprising directing the flow of sulfur-containing liquid passed into said mixing and atomizing nozzle against an impingement member in said nozzle to facilitate atomization of the sulfur-containing liquid.

47. The process as set forth in claim 46 wherein said mixing and atomizing nozzle comprises a spray head having said plurality of spray apertures therein and a chamber in said spray head, said impingement member protruding from said spray head into said spray head chamber at a location generally opposite said inner axial passage through which the sulfur-containing liquid is passed into said nozzle whereby the flow of sulfur-containing liquid is directed against said impingement member.

48. The process as set forth in claim 23 wherein said atomized sulfur combustion mixture is discharged into said combustion chamber through said plurality of spray apertures of said mixing and atomizing nozzle at a spray angle relative to the central longitudinal axis of the nozzle.

49. The process as set forth in claim 48 wherein said atomized sulfur combustion mixture is discharged into said combustion chamber through said plurality of spray apertures of said mixing and atomizing nozzle at a spray angle of from about 20° to about 30° relative to the central longitudinal axis of said nozzle.

50. The process as set forth in claim 23 wherein the atomized sulfur combustion mixture is discharged into said combustion chamber through at least four spray apertures of said mixing and atomizing nozzle.

51. The process as set forth in claim 50 wherein the atomized sulfur combustion mixture is discharged into said combustion chamber through at least six spray apertures of said mixing and atomizing nozzle.

52. The process as set forth in claim 51 wherein the atomized sulfur combustion mixture is discharged into said combustion chamber through at least eight spray apertures of said mixing and atomizing nozzle.

53. The process as set forth in claim 50 wherein said plurality of spray apertures of said mixing and atomizing nozzle through which said atomized sulfur combustion mixture is discharged into said combustion chamber are arranged in a circular pattern.

54. A process for the combustion of a sulfur-containing liquid to produce a combustion gas comprising sulfur dioxide, the process comprising:
introducing a flow of pressurized sulfur-containing liquid and a flow of pressurized atomizing gas into a sulfur lance comprising first and second conduits communicating with a mixing and atomizing nozzle having at least one spray aperture therein;

passing the pressurized sulfur-containing liquid through said first conduit and the pressurized atomizing gas through said second conduit into said mixing and atomizing nozzle;

passing the pressurized sulfur-containing liquid and the pressurized atomizing gas through said mixing and atomizing nozzle to affect atomization of the sulfur-containing liquid and form an atomized sulfur combustion mixture comprising particles of sulfur-containing liquid and atomizing gas discharged under pressure through said at least one spray aperture into a combustion chamber of a furnace, the particle size distribution exhibited by the atomized sulfur combustion mixture discharged into said combustion chamber being characterized by at least about 90% by volume of the particles of sulfur-containing liquid contained therein having a diameter of less than about 500 μm and a median particle diameter (volume or mass basis) of from about 50 μm to about 150 μm; and combusting the sulfur-containing liquid particles in the presence of oxygen in said combustion chamber to produce the combustion gas comprising sulfur dioxide.

55. The process as set forth in claim 54 wherein the particle size distribution exhibited by the atomized sulfur combustion mixture discharged into said combustion chamber is characterized by at least about 80% by volume of the particles of sulfur-containing liquid contained therein having a diameter of from about 50 μm to about 500 μm.

56. The process as set forth in claim 55 wherein the particle size distribution exhibited by the atomized sulfur combustion mixture discharged into said combustion chamber is characterized by at least about 80% by volume of the particles of sulfur-containing liquid contained therein having a diameter of from about 60 μm to about 200 μm.

57. The process as set forth in claim 55 wherein the combustion gas has a sulfur dioxide gas strength of from about 8 to about 14 mole % and contains no more than about 20 ppmv nitrogen oxides.

58. The process as set forth in claim 57 wherein the combustion gas contains no more than about 15 ppmv nitrogen oxides.

59. The process as set forth in claim 58 wherein the combustion gas contains no more than about 10 ppmv nitrogen oxides.

60. The process as set forth in claim 59 wherein the combustion gas contains no more than about 5 ppmv nitrogen oxides.

61. The process as set forth in claim 54 wherein the median particle diameter (volume or mass basis) of sulfur-containing liquid particles in the atomized sulfur combustion mixture discharged into said combustion chamber is from about 60 μm to about 120 μm.

62. The process as set forth in claim 61 wherein the median particle diameter (volume or mass basis) of sulfur-containing liquid particles in the atomized sulfur combustion mixture discharged into said combustion chamber is from about 60 μm to about 100 μm.

63. The process as set forth in claim 54 wherein control of the particle size of the sulfur-containing liquid particles in the atomized sulfur combustion mixture discharged into said combustion chamber comprises adjusting the ratio of the pressure of the sulfur-containing liquid introduced into said sulfur lance to the pressure of said atomizing gas introduced into said sulfur lance.

64. A method for retrofitting an apparatus for the combustion of a sulfur-containing liquid to produce a combustion gas comprising sulfur dioxide wherein the apparatus comprises a furnace comprising a combustion chamber, a pressurized source of the sulfur-containing liquid, and at least one sulfur lance positioned for discharging an atomized sulfur combustion mixture comprising particles of the sulfur-containing liquid into said combustion chamber wherein the sulfur-containing liquid particles are combusted in the presence of oxygen to produce the combustion gas comprising sulfur dioxide, said sulfur lance being adapted to hydraulically atomize the sulfur-containing liquid from said pressurized source and discharge the atomized sulfur combustion mixture under pressure into said combustion chamber, the method comprising:

providing a pressurized source of an atomizing gas; and positioning at least one additional or replacement sulfur lance to discharge a pneumatically atomized sulfur combustion mixture comprising particles of the sulfur-containing liquid and an atomizing gas into said combustion chamber wherein the sulfur-containing liquid particles are combusted in the presence of oxygen to produce the combustion gas comprising sulfur dioxide, said additional or replacement sulfur lance comprising a mixing and atomizing nozzle directed into said combustion chamber, a first conduit communicating with said pressurized source of sulfur-containing liquid and said nozzle and a second conduit communicating with said pressurized source of atomizing gas and said nozzle, said nozzle being adapted for mixing the sulfur-containing liquid and the atomizing gas to form the pneumatically atomized sulfur combustion mixture and having a plurality of spray apertures therein through which the pneumatically atomized sulfur combustion mixture is discharged under pressure into said combustion chamber.

\* \* \* \* \*